United States Patent [19]
Emling

[11] 3,967,564
[45] July 6, 1976

[54] SOIL SHATTERING AND AERATING DEVICE

[76] Inventor: Leo B. Emling, 477 E. Eugene Drive, Bourbonnais, Ill. 60914

[22] Filed: Mar. 3, 1975

[21] Appl. No.: 554,614

[52] U.S. Cl. .................................. 111/7; 172/145
[51] Int. Cl.² .................................... A01C 23/00
[58] Field of Search .............. 111/7, 6, 85; 172/145

[56] References Cited
UNITED STATES PATENTS

| 1,717,911 | 6/1929 | Brewer | 111/7 |
|---|---|---|---|
| 1,739,765 | 12/1929 | McEwen | 111/7 |
| 2,272,190 | 2/1942 | Elliott | 111/7 |
| 2,988,026 | 6/1961 | Heckathorn | 111/7 |
| 3,799,079 | 3/1974 | Dietrich | 111/7 |

Primary Examiner—Stephen C. Pellegrino
Attorney, Agent, or Firm—James R. McKnight

[57] ABSTRACT

A device for shattering impacted soil, attached to and operated by a farm tractor having a pipe positioned high above the ground for intake of air for providing forced air to a tube extending under the soil following its shattering to supply oxygen under, to and through the soil for replenishing the same for increased plant yield.

3 Claims, 3 Drawing Figures

SOIL SHATTERING AND AERATING DEVICE

In normal tillage and weed control, and after heavy rains, soil compacts together so hard and tight that the supply of oxygen becomes exhausted, and must be replenished to sustain microbe life necessary for plant growth.

It is among the objects of my invention to solve this problem by cracking and shattering the compacted soil and directing forced air into the shattered soil to supply a fresh and increased supply of oxygen to and through the soil, in planted and unplanted fields.

With my invention, I obtain air from the atmosphere high above the soil, where the air is richer in oxygen, for prompt application under the soil for the replenisment of oxygen in the oxygen starved soil.

My oxygen enriched soil results in increased plant growth, and greater production and yield of crops in both quantity and quality without the costly need of increased fertilization.

My invention also comprises such other objects, advantages and capabilities as will later more fully appear, and which are inherently possessed by my invention.

While I have shown in this application, preferred embodiments of my invention, yet the same are susceptible of modificaton and change without departing from the spirit of my invention.

Referring to the drawings.

Figure 1:
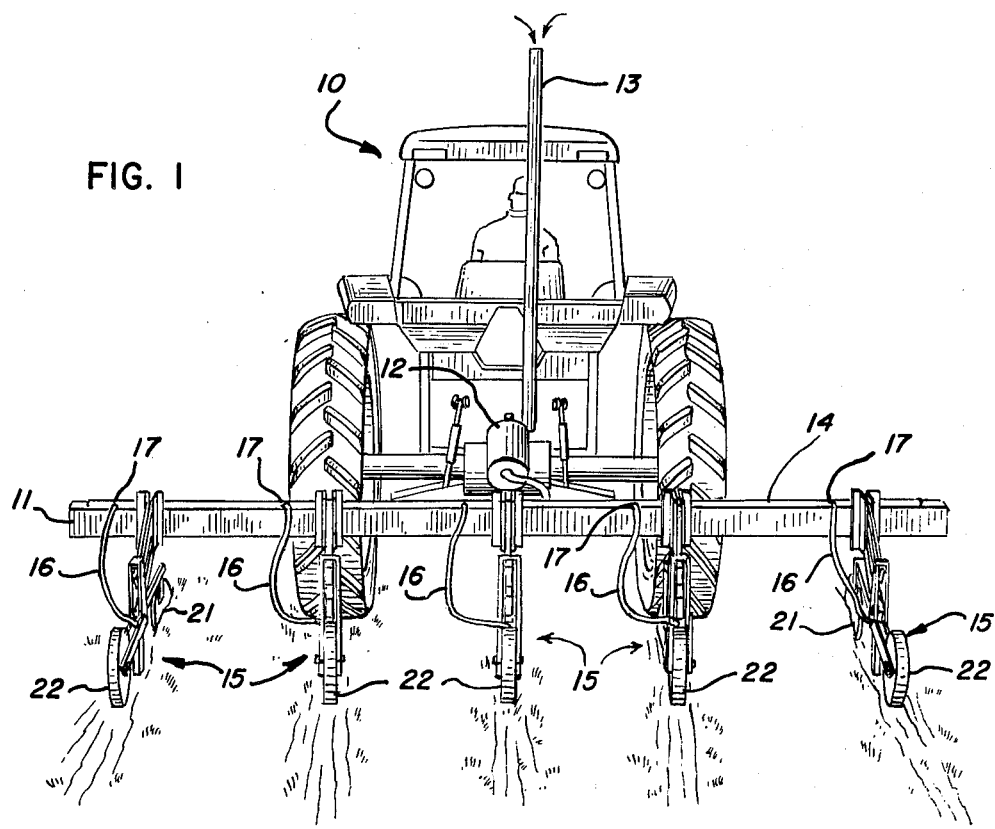
FIG. 1 is a rear perspective view of my device.
Figure 2:
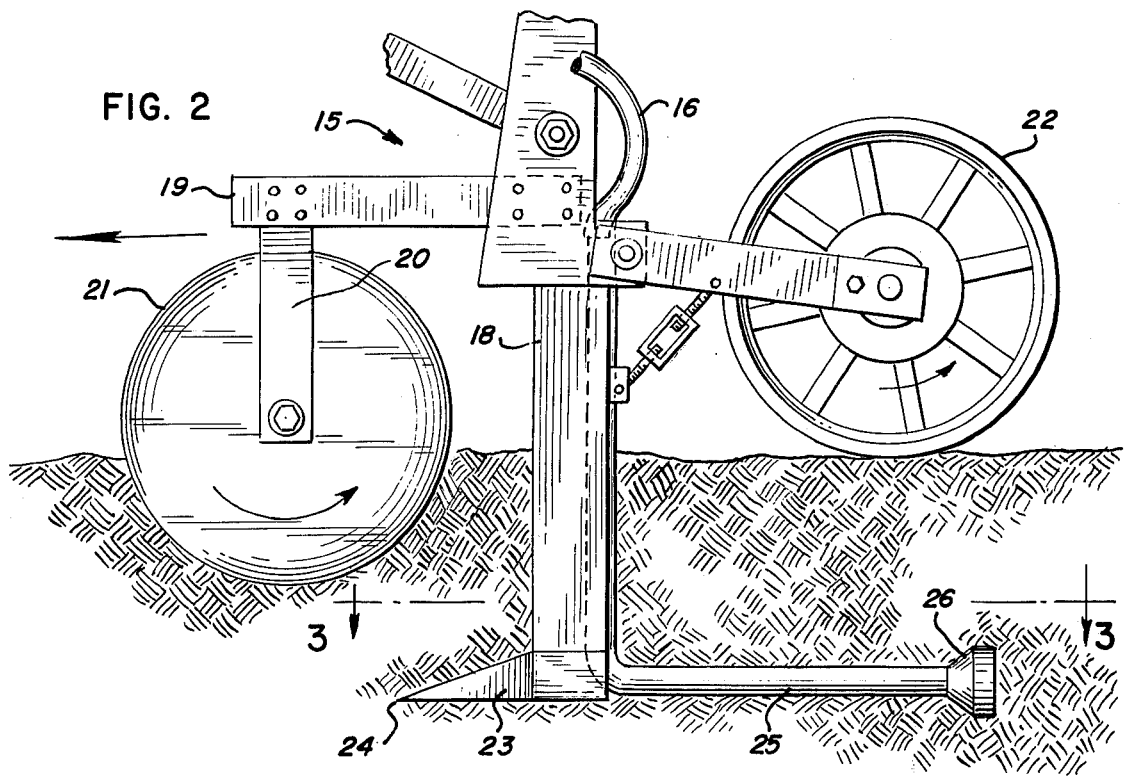
FIG. 2 is a side elevational view.
Figure 3:
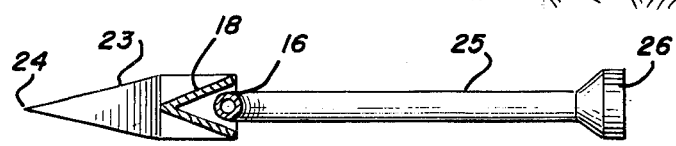
FIG. 3 is a sectional view on line 3—3 of FIG. 2.

The embodiment selected to illustrate my invention comprises a farm tractor 10, equipped with a three point hitch, power takeoff, and a support or tool bar 11 at its rear end supporting an air pump, or rotary air blower 12. An air intake pipe 13 extends vertically above to receive air from the atmosphere, pumped therein by pump 12 operated by the power takeoff of tractor 10. This air is moved to manifold 14 also positioned on support 11.

I provide a plurality of spaced gangs 15, each provided with a flexible air tube 16 extending into an opening 17 of manifold 14. The gangs 15 are spacedly attached to tool bar 11 and are pulled by tractor 10.

The gangs 15 are flexible in up and down action. As they move up and down their attaching means will hold them at the same angle or they will float up and down independent of each other during operation.

In each gang 15, air tube 16 is held in position by vertical shank 18. Across shank 18 at its upper portion is horizontal member or arm 19. At the front of arm 19, a short depending member 20 is attached, to which is rotatably mounted rolling coulter 21.

At the other or rear end of member 19 is rotatably mounted a cover and depth wheel 22 having substantial width of from 4 to 5 inches.

At the bottom of shank 18 is attached a foot 23 extending forwardly and slightly downwardly to point 24.

At the lower end of shank 18, air tube 16 extends rearwardly as shatter tube 25. Adjacent the outer end of shatter tube 25 is attached an enlarged swedge 26.

A plurality of gangs 15 are spacedly attached to tool bar 11 and are pulled by tractor 10 over a plurality of rows of plants. Their respective air tubes 16 and shatter tubes 25 are fed air from air pipe 13 through manifold 14 operated by pump 12 through the power takeoff of tractor 10.

In operation, the coulter 21 cuts an opening through the impacted soil, and pushes it to the side. The point of the foot provides a suction to give the depth needed and cracks and shatters the soil; the air is forced into the opening of the soil, to provide oxygen and other materials to be absorbed. The cover wheel and the swedge tends to close the opening in the soil to prevent fast escape of air.

The forced air coming out of the rear open end of each shatter tube passes up and through the cracks in the shattered soil, so that absorption of oxygen takes place.

Having thus described my invention, I claim:

1. A soil shattering device providing forced aeration for the shattered soil comprising a farm tractor having a power takeoff and a tool bar support, an air intake pipe extending high above the ground, a manifold and a pump positioned on said support, said pump operated by the power takeoff for forcing air from the atmosphere into said pipe and down to said manifold, a plurality of aeration gangs spacedly attached to and pulled by said tractor, each of said gangs having a horizontal arm, a rolling coulter rotatably mounted on the front portion of said arm, and a depth cover wheel mounted on the rear portion of said arm, a shank attached to and extending downwardly from said arm, a foot attached to the bottom end of said shank and having a front point extending forwardly and slightly downwardly to cut an opening in the soil, an air tube extending from said manifold to receive forced air from said pipe, and extending downwardly to the lower end of said shank, and then extending rearwardly as a shatter tube to force air into the soil at the opening and an enlarged swedge attached to said air tube adjacent its open outer end, said depth cover wheel and said swedge cooperating to act as a means to close the opening in the soil to prevent fast escape of air from the soil.

2. The device as set forth in claim 1, in which the depth cover wheel has a width of several inches.

3. The device as set forth in claim 1, in which the shatter tube extends rearwardly as far as beyond the center of the cover wheel.

* * * * *